United States Patent [19]

Parkinson

[11] Patent Number: 4,997,691
[45] Date of Patent: Mar. 5, 1991

[54] RETORTABLE CONTAINER

[75] Inventor: Keith Parkinson, Seaford, Va.

[73] Assignee: QuesTech Ventures, Inc., Newport News, Va.

[21] Appl. No.: 257,206

[22] Filed: Oct. 13, 1988

Related U.S. Application Data

[63] Continuation-in-part of Ser. No. 107,574, Oct. 13, 1987, Pat. No. 4,836,764.

[51] Int. Cl.$^5$ .................. B65D 25/00; B29C 51/00
[52] U.S. Cl. .................................... 428/35.7; 220/453;
  220/461; 264/241; 264/320; 264/322; 428/36.6;
  428/36.7; 428/518; 428/52 D
[58] Field of Search .................. 428/35.7, 36.6, 36.7,
  428/518, 520; 220/453, 461; 264/241, 314, 320,
  322

[56] References Cited

U.S. PATENT DOCUMENTS

| | | | |
|---|---|---|---|
| 3,606,958 | 9/1971 | Coffman | 220/63 |
| 3,684,258 | 8/1972 | Coffman et al. | 263/6 R |
| 4,562,325 | 3/1987 | Benge et al. | 428/36.7 |
| 4,647,509 | 3/1987 | Wallace | 428/518 |
| 4,681,797 | 7/1987 | Van Iseghem | 428/518 |

*Primary Examiner*—James Seidleck
*Attorney, Agent, or Firm*—Joseph Scafetta, Jr.

[57] ABSTRACT

A retortable container has a wall of at least two co-formed laminas. This wall is highly impermeable to fluids selected from the group consisting of oxygen and aromatic vapors. The wall includes a first load-carrying lamina of a first plastic material. This load-carrying lamina has been formed without mechanical hysteresis in the melt phase by a thermal pressure forming apparatus to cause strengthening with orientation of the load-carrying lamina in at least one axis but without memory of its pre-melt phase shape. The wall also includes a second sealing lamina of a second plastic material. This second sealing lamina is coextensive with the first load-carrying lamina. Consequently, the container formed by the apparatus is retortable, i.e. it can withstand temperatures and pressures of a retort chamber without undergoing significant and permanent distortion.

16 Claims, 10 Drawing Sheets

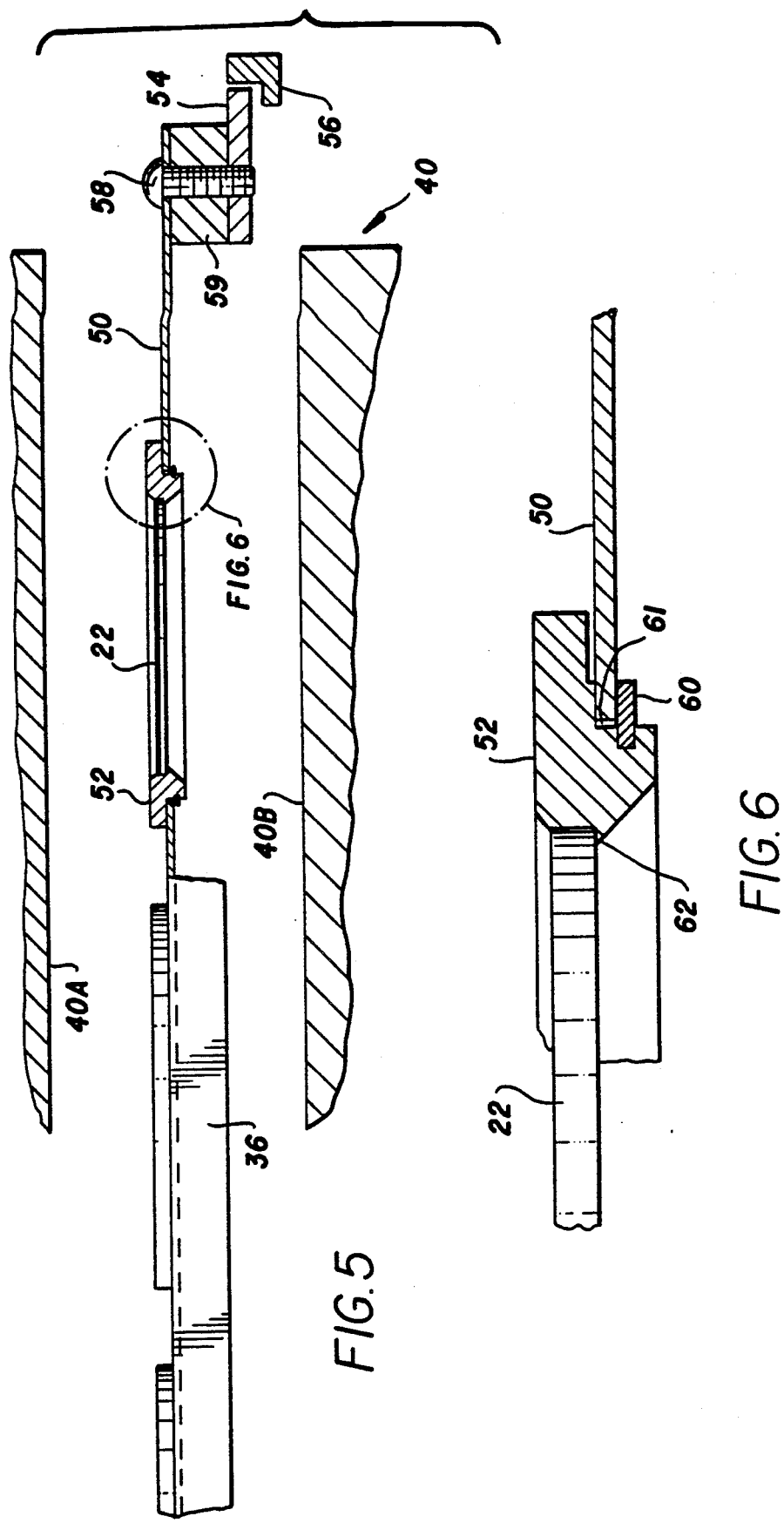

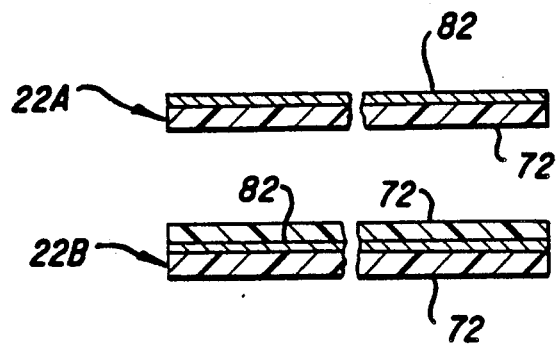
FIG. 15
FIG. 16
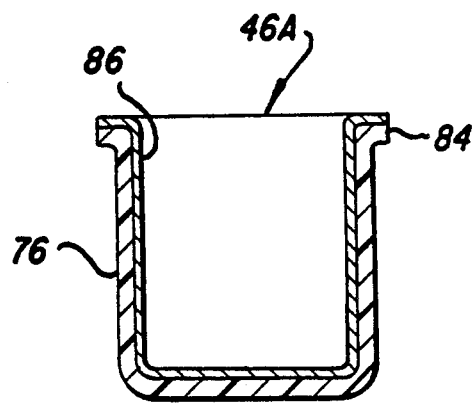
FIG. 17
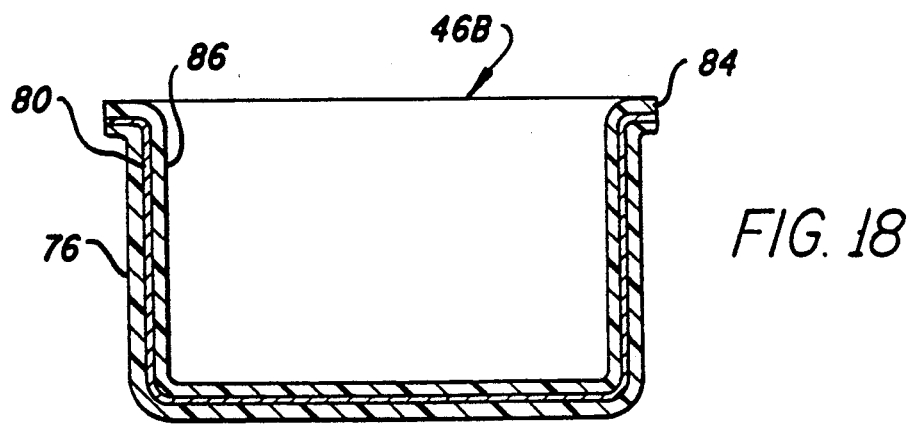
FIG. 18

RETORTABLE CONTAINER

CROSS-REFERENCE TO RELATED APPLICATION

This application is a continuation-in-part of U.S. Pat. application Ser. No. 07/107,574 filed Oct. 13, 1987, now U.S. Pat. No. 4,836,764.

BACKGROUND OF THE INVENTION

1. Field of the Invention

The present invention relates to receptacles generally and to retortable containers, in particular.

2. Description of the Related Art

Processes and devices for producing plastic containers of either a monolayer or laminated multilayers providing barriers to both gas and moisture are old and well-known in the food packaging industry. Conventionally, such processes include the steps of extruding sheets of plastic material, cutting blanks or billets from such sheets, heating the material to a desired temperature range, and pressure forming the material into food or beverage containers. Thereafter, the containers are sealed so that the contents may be stored for extended periods of time without spoilage.

Exemplary prior art methods and apparatuses were developed by the Shell Oil Company and patented between 1970 and 1986. Generally, this technology is known as solid-phase pressure forming (SPPF) because the container is formed under pressure while the plastic blank is hot but still in its solid (unmelted) phase. An exemplary nonretortable container made by this so-called SPPF technology was protected by U.S. Pat. No. 3,606,958 which issued on Sept. 21, 1971, in the name of Paul M. Coffman, and which was assigned to the Shell Oil Co. of New York.

The preferred method and apparatus used in SPPF technology extrudes plastic in long, thin (generally 0.030 to 0.100 inches) sheets for subsequent processing. However, SPPF technology is limited to forming containers while the plastic blanks are still in their solid phase, i.e. at temperatures below the crystalline melt point of the material.

The solid to liquid (melt) transition takes place over a temperature range for each particular polymer. A calorimeter will measure the heat input required to raise the temperature of a sample of the material. The latent heat required to melt the material can be measured and it will be noted that melting begins at a certain temperature and continues over a wide temperature range. A majority of the melting will occur at a particular temperature noted by a peak on the differential Scanning Calorimeter curve. This temperature is commonly referred to as the "melting point". The range for polypropylene may be from 240 to 340 degrees Fahrenheit (F) with the "melt point" peak at 330 degrees F. SPPF technology is practiced normally at 320 to 328 degrees F.

Heretofore, it has not been practicable to package and process many commodities, particularly those containing bulk solids, in thermoformed plastic containers because the containers could not withstand the combination of pressures and temperatures in a retort chamber without undergoing significant distortion.

SPPF technology requires that the temperature of the plastic materials during the thermal pressure forming stages remain in a domain generally 5 to 20 degrees F below the melting point of the plastic. Thermal pressure forming of the plastic material in this temperature range insures that the material is soft enough to be formed into containers but that such plastic material does not reach the melt phase, at which point severe handling problems start to occur. Such containers are generally not retortable.

Other exemplary prior art methods and apparatuses were developed by the Dow Chemical Company and patented between 1973 and 1977. This technology is generally known as the Scrapless Forming Process (SFP) in which containers are formed from square "chips" cut from an extruded plastic sheet. The square chips are first forged into circular discs (for circular containers), which discs are then formed under pressure into containers. No scrap is generated in the process steps from cutting the chip to forming the container.

Containers produced using SFP technology have also been found to be unsatisfactory for retorting because here also the forming process is essentially the same as SPPF technology in that stress relaxation, effected by the elevated temperatures and pressures of a commercial canning retorter, will cause unacceptable deformation of containers. Furthermore, SFP technology requires that the billets or chips be lubricated prior to the forging step. Though necessary for the Scrapless Forming Process, the use of lubricants is undesirable for containers intended for the storage of human foodstuffs.

The prior art specifically acknowledges a marked tendency of melt-phase plastic billets or blanks to deform during heating and the serious handling problems that occur if the plastic blanks are heated above their melting points. Thus, it remains a problem in the prior art, particularly in SPPF and SFP technologies, to produce a plastic container which can be used in a commercial canning retort process without becoming distorted to an undesirable extent.

SUMMARY OF THE INVENTION

It is a primary purpose of the present invention to provide a retortable plastic container which is a substantial unobvious improvement over the nonretortable plastic container covered by U.S. Pat. No. 3,606,958 of Coffman in that, unlike the Coffman container, the present invention can survive in a commercial canning retorter without significant unacceptable distortion. In such retorts, containers and their contents of food or beverage are subjected to elevated temperatures (approximately 260 degrees F) for an extended period of time such that harmful microorganisms therein are killed.

It is an object of the present invention to provide a retortable plastic container into which food, beverages, or other consumable contents may be first placed and sealed after which both the container and its contents may be heated within a retort chamber to approximately 260 degrees F without evidencing significant permanent distortion of the container.

It is another object of the present invention to manufacture a retortable plastic container being capable of competing with metal cans and glass jars in the food canning industry and also being capable of surviving radiation in a microwave oven without undergoing significant and permanent distortion.

The inventor is aware that plastic containers, particularly those manufactured by SPPF and SFP technologies, are severely prone to deformation during the process of retortion. The process of extruding a molten plastic into a single or multilayered sheet causes a polymer orientation that on cooling induces internal stresses within the plastic material. Such internal stresses may vary in intensity within the extruded sheet. Furthermore, the subsequent heating step in SPPF technology, in which the heated billets or blanks remain in the solid phase, does not effectively relieve these internal stresses, even though the blanks are heated sufficiently to facilitate forming. Thus, it is necessary to heat the plastic blanks above the crystalline melting point in order to effectively relax or relieve the internal stresses introduced by the sheet extruding step.

Furthermore, the inventor has noted that the problem of handling plastic blanks while in the melt phase has not heretofore been satisfactorily solved. The prior art technologies have acknowledged that plastic at or above its crystalline melting point is very sticky and tends to undergo reversion or other changes in shape as the internal stresses are relaxed. Thus, any process or apparatus using plastic blanks at or above the melting point must either avoid these undesirable qualities or somehow mitigate their effects in order to form a retortable plastic container.

These and other objects of the present invention will be more fully understood from the following description of the drawings and the preferred embodiments.

BRIEF DESCRIPTION OF THE DRAWINGS

The present invention will be described in connection with the accompanying drawings wherein:

FIG. 5 is a sectional side elevational view taken along line 5—5, in FIG. 4;

FIG. 6 is a detailed sectional view of part of FIG. 5;

FIG. 15 is a partial cross-sectional view of a first embodiment of the precut plastic blank;

FIG. 16 is a partial cross-sectional view of a second embodiment of the precut plastic blank;

FIG. 17 is a cross-sectional view of a first embodiment of a retortable container formed from the precut plastic blank shown in FIG. 15; and FIG. 18 is a cross-sectional view of a second embodiment of a retortable container formed from the precut plastic blank shown in FIG. 16.

DETAILED DESCRIPTION OF THE PREFERRED EMBODIMENTS

Figure 1:
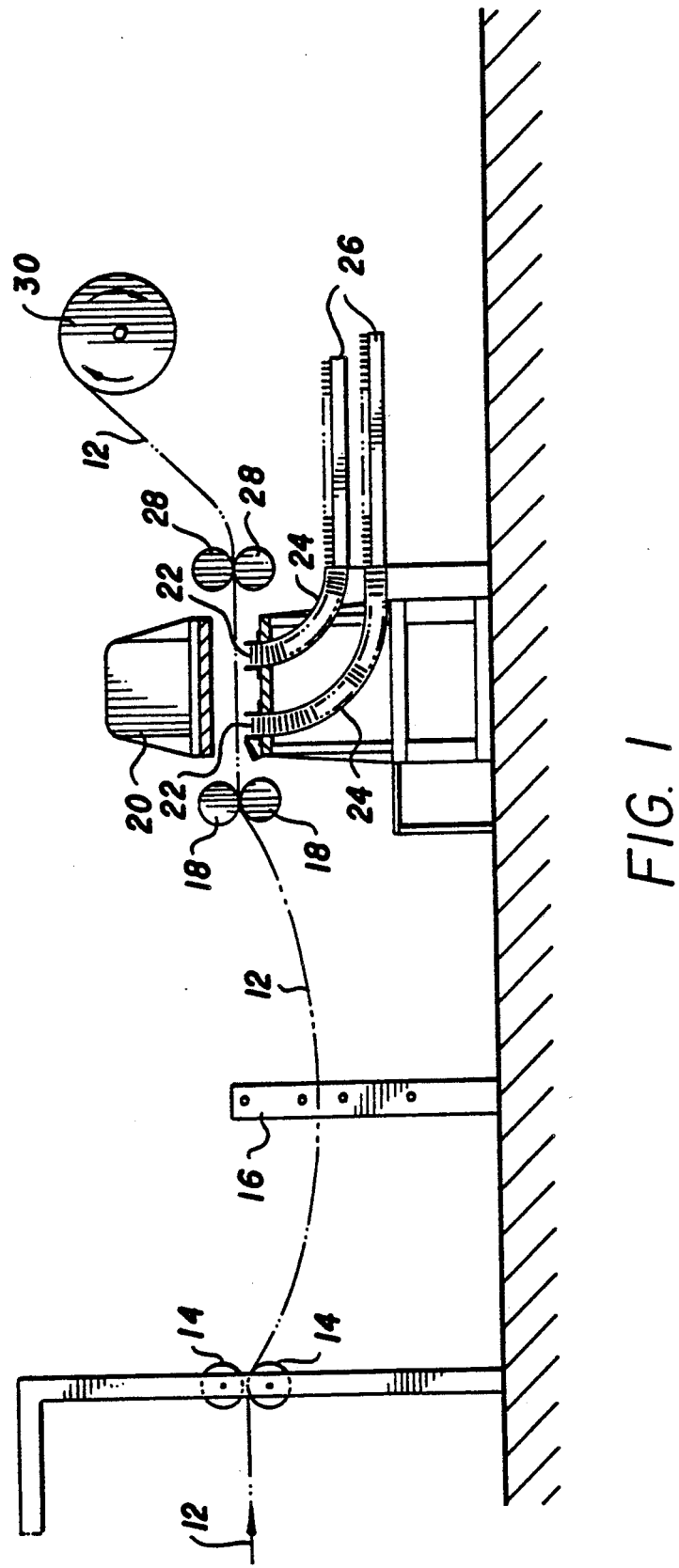
FIG. 1 is a side elevational view of a plastic blank cutting, and stacking system.
Figure 2:
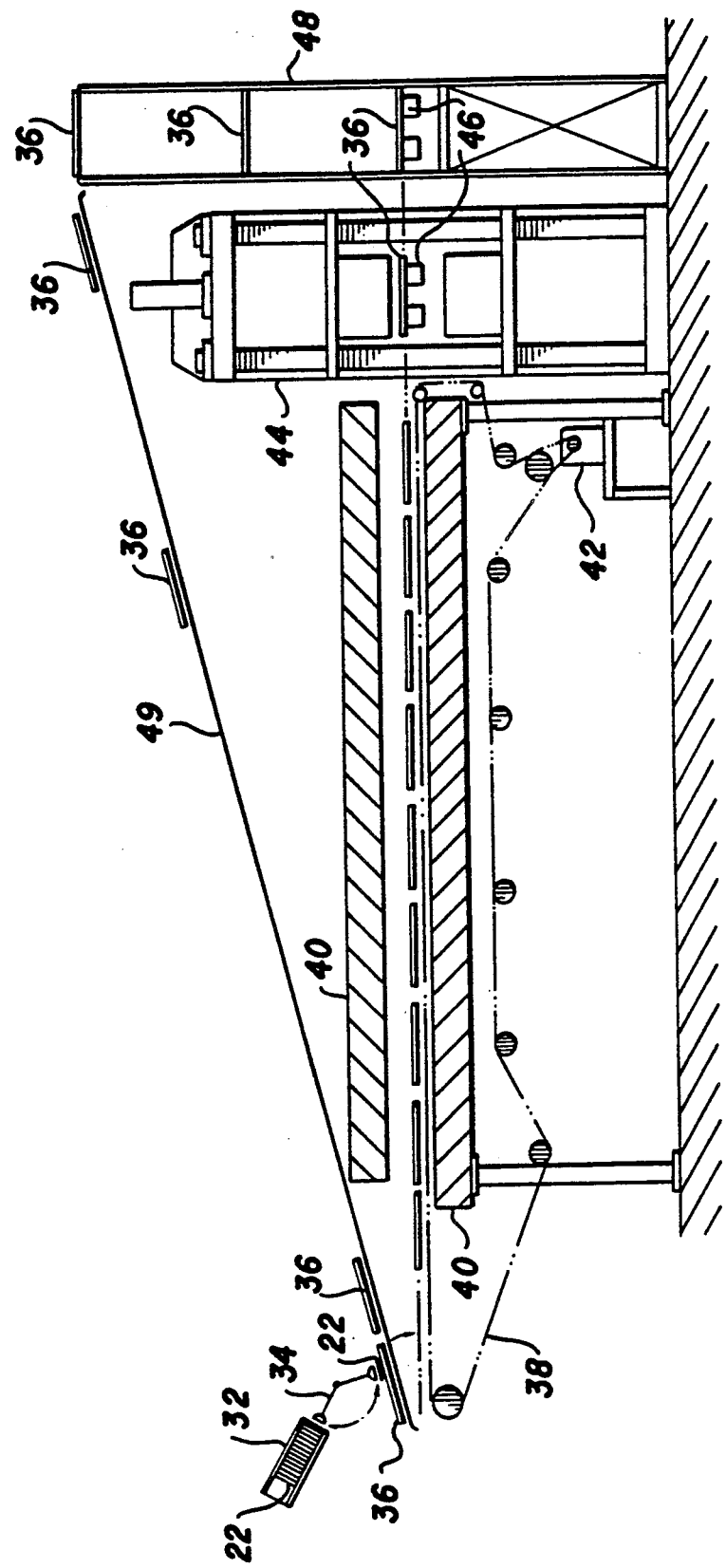
FIG. 2 is a side elevational view of a precut plastic blank feeding, heating, forming, and conveying system.

In general, the plastic blank cutting and stacking system is shown in FIG. 1 and the precut plastic blank feeding, heating, forming, and conveying system is shown in FIG. 2.

In FIG. 1, a wide, flat sheet of extruded plastic material 12 enters from the left-hand side into the plastic blank cutting and stacking system either directly from an extruder, a roll, or a sheet (all not shown). The plastic material 12 may be either a monolayer or a laminate comprised of multiple layers providing one or more barriers to both gas and moisture. After passing through idler rollers 14, the plastic material 12 enters a frame 16 which regulates the rate at which the cutting press 20 cycles. This frame 16, which constitutes a press cycle regulating system, being of conventional design, is shown only schematically. After passing through feed rollers 18, the plastic material 12 enters a press 20 which descends to cut blanks 22 out of the sheet of plastic material 12. The plastic blanks 22 may be in the shape of thin circular "hockey pucks" but also may be cut into any desired nonround shape, e.g. rectangular, hexagonal or elliptical. The blanks 22 fall into tubes 24 which guide the blanks 22 from the press 20 into holding trays 26. From the holding trays 26, the blanks 22 may be either placed into sleeve bags, long flexible sleeves (not shown) for shipping, or placed directly into a blank feeding system, to be discussed hereinafter in regard to FIG. 2. After the blanks 22 have been cut out of the sheet of plastic material 12, the remaining sheet web is pulled through the press 20 by take-off rollers 28 synchronously coupled by drive chains (not shown) to the feed rollers 18 and is wound up on a web spooler 30. This web of plastic material 12 may then be recycled.

In FIG. 2, the precut plastic blanks 22 taken from the holding trays 26 of FIG. 1 are placed in a multiplicity of hoppers 32. At the bottom of the hoppers 32, a multiplicity of vacuum placers 34 take individual precut blanks 22 and place each one in a separate carrier ring 52 on a tray 36. Thereafter, the tray 36 is placed onto a conveyor 38. Each tray 36 carrying a plurality of precut blanks 22 is transported by the conveyor 38 into an oven 40. The speed of the conveyor 38 is regulated by a variable speed motor 42 while the temperature of the oven 40 is controlled by a programmable controller (not shown) that also controls the speed of the motor 42 such that the trays 36 spend an amount of time in the oven 40 sufficient to bring the blanks 22 to a predetermined temperature which would normally be at or above the melting point of the plastic material. In this melt phase state, each plastic blank 22 retains its original peripheral dimensions but is sticky to touch and is extremely prone to deformation and scoring. After exiting the oven 40, each tray 36 enters a press 44 which forms the plurality of plastic blanks 22, in place, into a plurality of retortable containers 46. The trays 36 carrying the containers 46 are then transferred from the press 44 onto an elevator 48. Prior to the trays 36 being raised by the elevator 48, the containers 46 are removed from the trays 36 by a container removal mechanism (not shown) for packing, palletizing, shipping and/or subsequent handling in a food processing system (not shown). The trays 36 are then raised to the top of the elevator 48 where each tray 36 is transferred to a conveyor 49 which returns such trays 36 to the precut blank feeding system.

Figure 3:
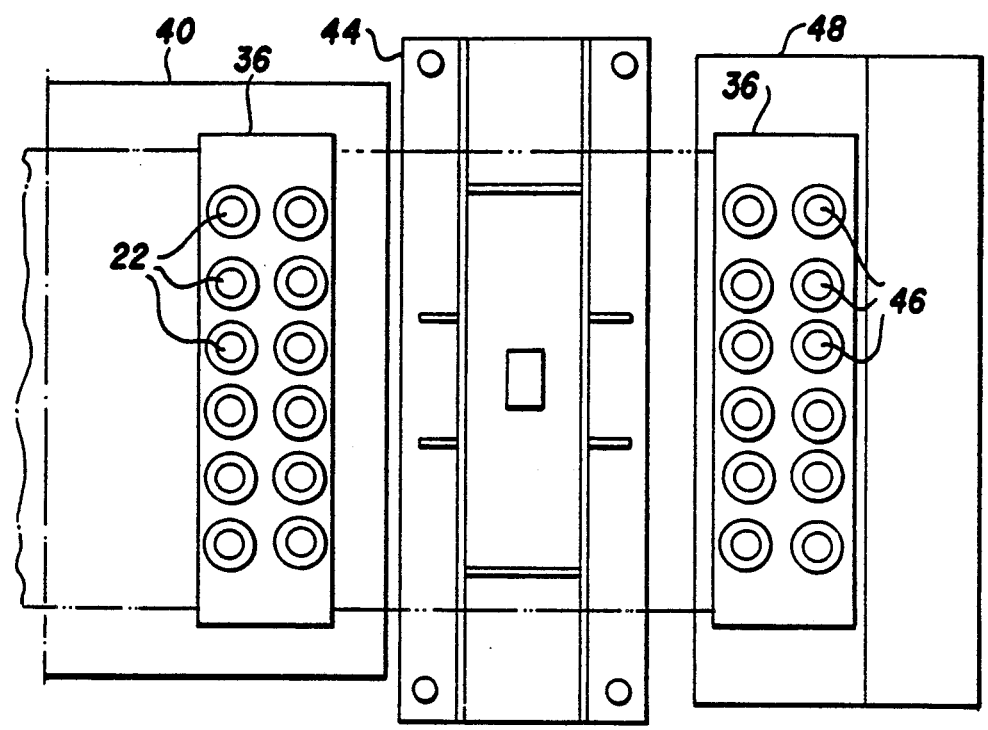
FIG. 3 is a partial top plan view of the precut plastic blank heating and forming system shown in FIG. 2.

In FIG. 3 at the left-hand side thereof, one tray 36 carrying a plurality of plastic blanks 22 is about to exit the oven 40 and to enter the forming press 44. While in the forming press 44, the plastic blanks 22 are in their melt phase and, thus, with their internal stresses substantially relieved, are formed into retortable containers 46. After the plastic blanks 22 are formed into containers 46, each tray 36 holding the newly formed containers 46 is transferred from the press 44 and placed on the elevator 48 where the containers 46 are removed.

Figure 4:
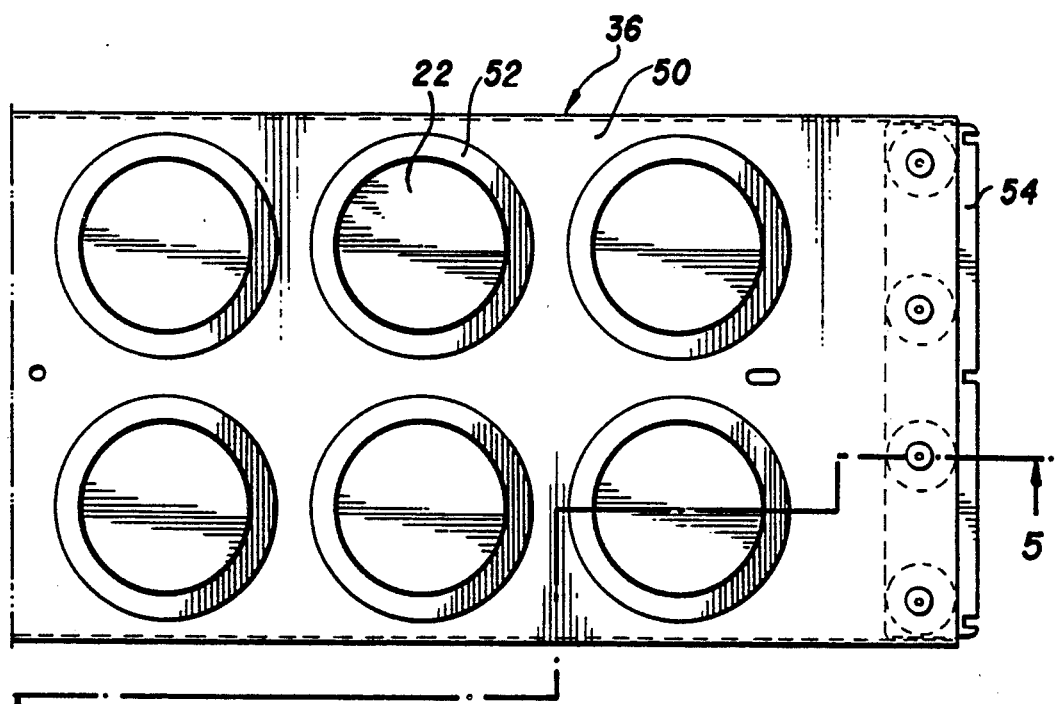
FIG. 4 is a top plan view of one-half of a tray (turned sideways) showing carrier rings holding one precut plastic blank each.

In FIG. 4, one-half of an exemplary tray 36 is turned sideways for viewing. Each tray 36 includes a base plate 50 having a plurality of holes cut therethrough and each hole serves to hold a carrier ring 52 therein. In turn, each carrier ring 52 holds a plastic blank 22. The carrier rings 52 may vary in size and number depending upon the size and shape of the blanks 22. Also in FIG. 4, there is shown an edge guide 54 which confines the tray 36 in its movement on the conveyor 38 through the oven 40.

In FIG. 5, the tray 36 is shown in the oven 40 with an upper heating element 40A positioned above the tray 36 and a lower heating element 40B positioned below the tray 36. The edge guide 54 engages a support 56 which is a part of the conveyor 38 shown in FIG. 2. This edge guide 54 is secured to the base plate 50 of the tray 36 by a fastener 58. An insulating stand-off block 59 spaces the base plate 50 from the edge guide 54 to minimize heat transfer from the base plate 50 to the support 56. Because each carrier ring 52 sits on the periphery of a hole cut completely through the base plate 50 of the tray 36, the top and bottom surface of each plastic blank 22 is exposed to its respective upper or lower heating element 40A or 40B. Thus, the blank 22 is heated substantially uniformly over its top and bottom surfaces.

In FIG. 6, the carrier ring 52 is shown to be retained by a wave spring 60 at its lower outer periphery in the base plate 50 of the tray 36. Alternatively, a snap ring or other means may be used in place of the wave spring 60. Clearance 61 is left between the base plate 50 and the carrier ring 52 to compensate for thermal expansion of the tray 36 when it is heated in the oven 40 and to facilitate proper placement of the carrier ring 52 in the press 44. The carrier ring 52 has a small ledge 62 on its inner periphery upon which the bottom peripheral surface of the plastic blank 22 rests.

The side edge of the plastic blank 22 is in contact with an upstanding wall on the inner periphery of the carrier ring 52. These areas of contact on the ledge 62 and along the peripheries of the plastic blank 22 keep its edge in the solid phase, even though the body of the blank 22 has been heated to or above its melting point, because the metal carrier ring 52 is maintained at a temperature slightly below the crystalline melt temperature of the plastic blank 22 and functions as a heat sink. Contact between the cooler metal carrier ring 52 and the plastic blank 22 prevents only the outer periphery of the blank 22 from reaching melt phase, thus lending hoop strength and peripheral dimensional stability to the plastic blank 22.

Figure 7:
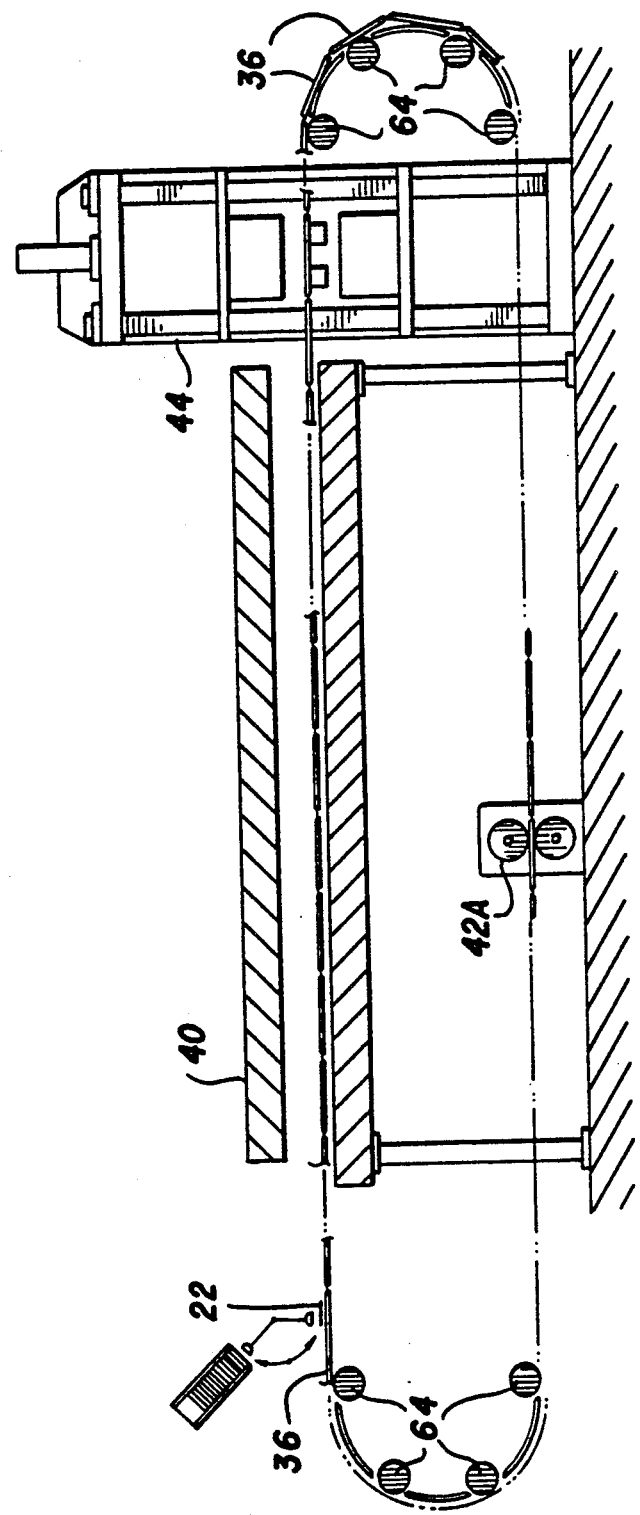
FIG. 7 is a side elevational view of a second embodiment of the precut plastic blank heating, forming and conveying system.

In FIGS. 7-10, a second embodiment of the precut plastic blank heating, forming and conveying system is shown. FIG. 7 shows how the trays 36 are linked together in a continuous loop which replaces the conveyor 38 and eliminates the need for the elevator 48 and the second conveyor 49. The trays 36 complete the loop by passing through the oven 40 and the forming press 44. After passing through the forming press 44, the containers 46 are removed from the trays 36 by the container removal mechanism (not shown). A motor 42A drives the trays 36 over guide sprockets 64 at both ends of the loop. In all other respects, the second embodiment of FIG. 7 is similar to the first embodiment of FIG. 2.

Figure 8:
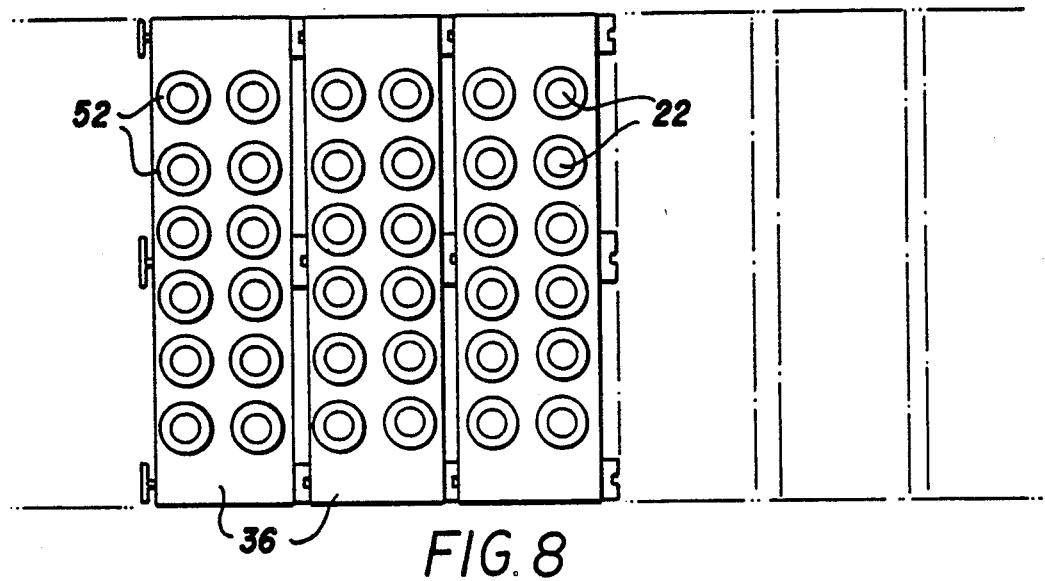
FIG. 8 is a partial top plan view of the precut plastic blank conveying system shown in FIG. 7.

In FIG. 8, a plurality of trays 36 having carrier rings 52 with precut plastic blanks 22 therein is shown. Each tray 36 is linked to the next succeeding tray 36 and to the tray 36 in front of it.

Figure 9:
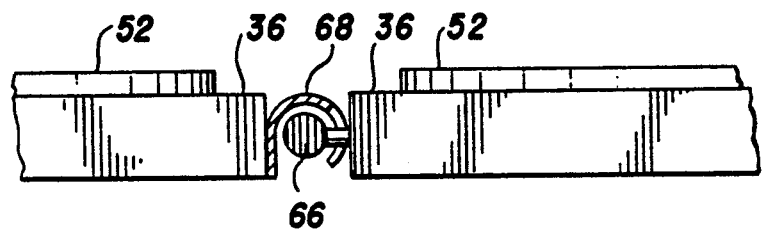
FIG. 9 is a detailed side elevational view of the precut plastic blank conveying system shown in FIG. 8.

In FIG. 9, one tray 36 is shown with a hook 66 at its rear end while the next tray 36 is shown with a claw 68 at its front end.

Figure 10:
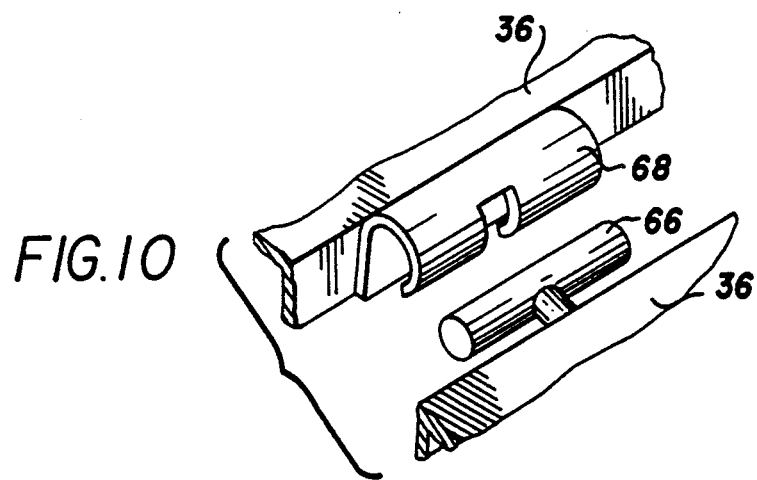
FIG. 10 is a perspective view of interconnecting linkage shown in FIG. 9.

In FIG. 10, the hook 66 of the tray 36 is T-shaped so that it may easily interconnect with the claw 68 of the adjacent tray 36. This hook and claw arrangement is merely one example of an interconnecting linkage and is not intended to show the only manner in which the trays 36 may be conveyed together.

Figure 11:
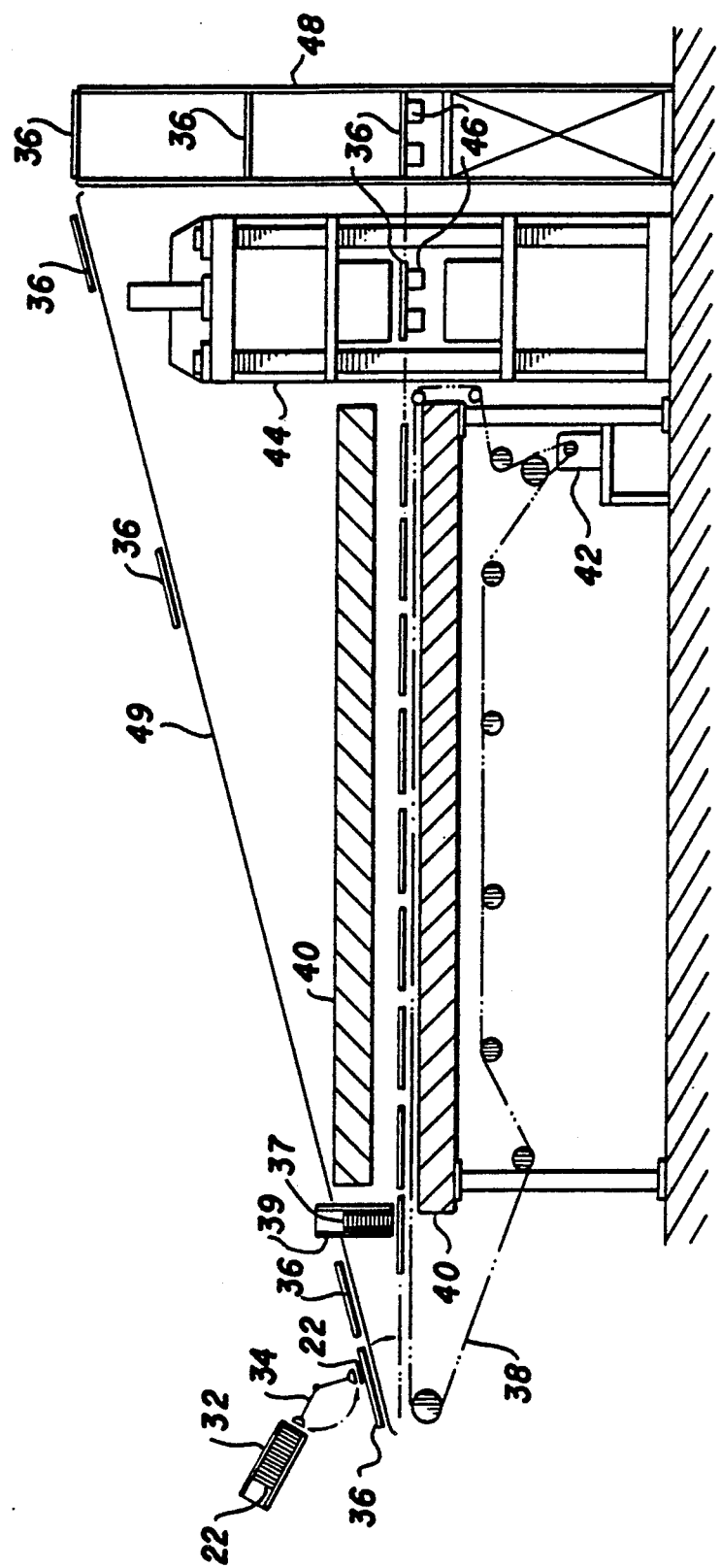
FIG. 11 is a side elevational view of a third embodiment of the precut plastic blank heating, forming and conveying system.
Figure 12:
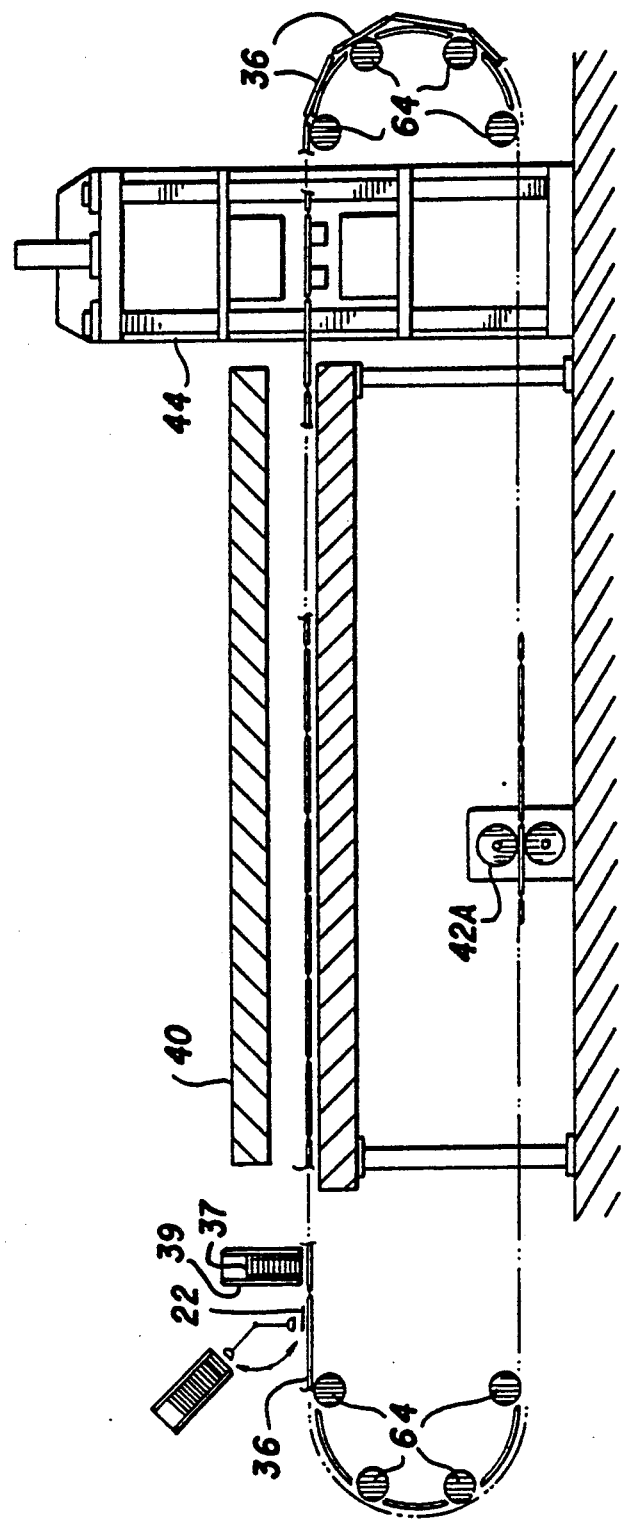
FIG. 12 is a side elevational view of a fourth embodiment of the precut plastic blank heating, forming and conveying system.

In FIGS. 11-14, third and fourth embodiments of the precut plastic blank heating, forming and conveying system are shown. The third embodiment shown in FIG. 11 is identical to the first embodiment shown in FIGS. 1-6 and the fourth embodiment shown in FIG. 12 is identical to the second embodiment shown in FIGS. 7-10, except that both the third and fourth embodiments incorporate a multiplicity of secondary hoppers 39 from the bottom of which individual retaining rings 37 are placed on the top peripheral edges of each plastic blank 22. Each tray 36 containing a plurality of plastic blanks 22, each with a retaining ring 37 thereon, is carried by the conveyor 38 into the oven 40.

Figure 13:
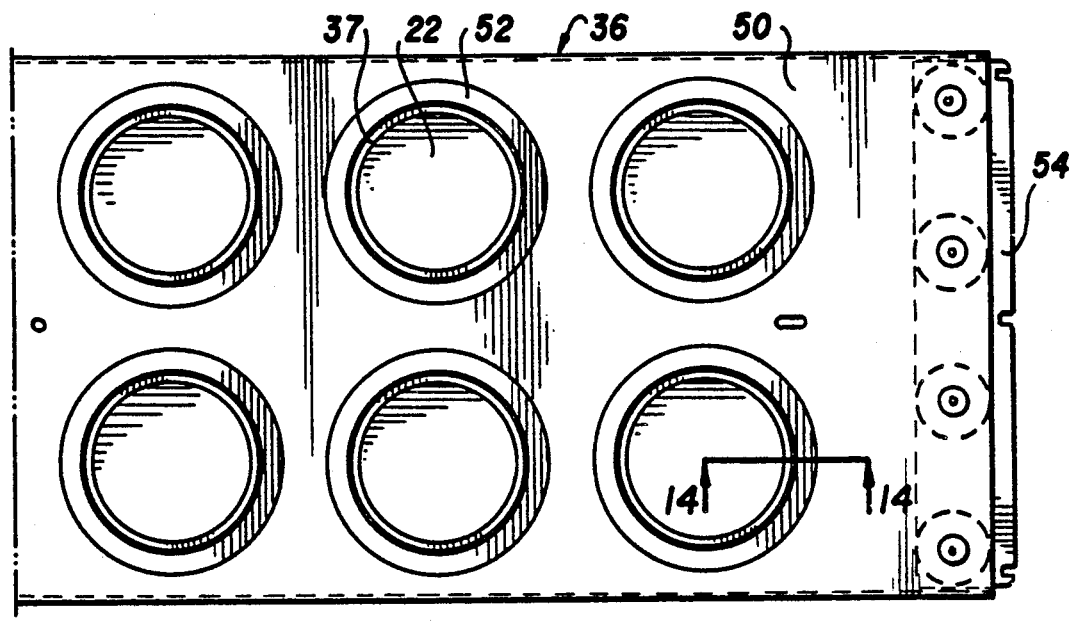
FIG. 13 is a top plan view of one-half of a tray (turned sideways) used in the third and fourth embodiments.

In FIG. 13, the retaining rings 37 are seated on top of a plurality of plastic blanks 22. These retaining rings 37 may vary in size and shape depending upon the size and shape of the plastic blanks 22 and the surrounding carrier rings 52. Each carrier ring 52 holds a single plastic blank 22 therein and one retaining ring 37 is placed on the outer periphery of each blank 22.

Figure 14:
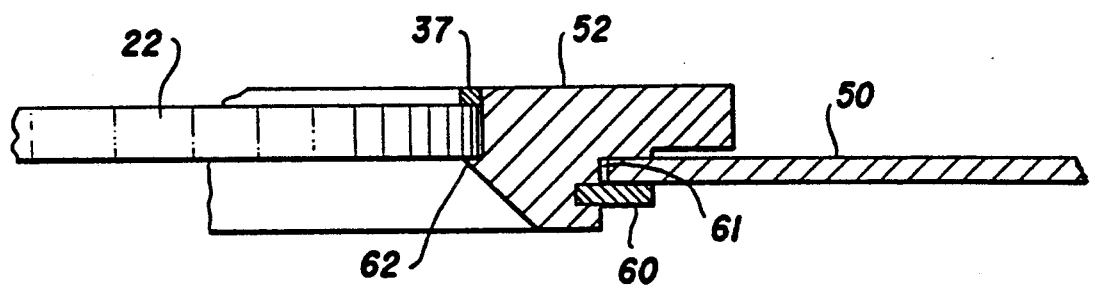
FIG. 14 is a detailed sectional view of part of FIG. 13.

In FIG. 14, the retaining rings 37 rest on the top peripheral edges of each plastic blank 22 in an area approximately corresponding to the area where the bottom peripheral edges of each plastic blank 22 rest on the ledge 62 of each carrier ring 52.

Thus, it may be seen that the purpose of each retaining ring 37 is twofold: first, to prevent the top outer periphery of each plastic blank 22 from reaching the melt phase, thus lending hoop strength and peripheral dimensional stability to the plastic blank 22; and second, to hold down each plastic blank 22 from jumping out of the carrier ring 52 in the event that the tray 36 is inadvertently bumped or suddenly jarred.

FIG. 15 relates to a first precut plastic blank 22A in which there is a first bottom load-carrying lamina 72 of a first plastic material and a second top sealing lamina 82 of a second plastic material.

FIG. 16 relates to a second precut plastic blank 22B in which the first load-carrying lamina 72 of the first plastic material sandwiches therebetween the second sealing lamina 82 of the second plastic material.

FIG. 17 shows a first retortable container 46A formed from the first precut plastic blank 22A of FIG. 15 and has an outer wall portion 76 made of the first load-carrying lamina 72 of the first plastic material and also has an inner wall portion 86 made of the second sealing lamina 82 of the second plastic material.

FIG. 18 shows a second retortable container 46B formed from the second precut plastic blank 22B of FIG. 16 in which both the outer wall portion 76 and the inner wall portion 86 are made of the first load-carrying lamina 72 which sandwiches therebetween an interior wall portion 80 made of the second sealing lamina 82 of the second plastic material.

Although the second sealing lamina 82 of FIGS. 15 and 16 which forms the inner wall portion 86 in FIG. 17 and the interior wall portion 80 in FIG. 18 is shown to be about half of the thickness of the first load-carrying lamina 72 of FIGS. 15 and 16 which forms the outer wall portion 76 in both FIGS. 17 and 18 as well as the inner wall portion 86 in FIG. 18, the relative thickness of the laminas 72 and 82 is actually greater, and, in some cases, can have a ratio of 10 to 1.

In FIG. 17, the first retortable container 46A has a wall of two portions 76 and 86 made of at least the two co-formed laminas 72 and 82 shown in FIG. 15. This wall is highly impermeable to fluids selected from the group consisting of oxygen and aromatic vapors. The wall comprises the outer wall portion 76 made of the first load-carrying lamina 72 of the first plastic material shown in FIG. 15. This first load-carrying lamina 72 is formed without mechanical hysteresis, i.e. without the phenomenon usually observed in elastic bodies, such as the precut plastic blanks 22A when subjected to stress, resulting in less energy being given out by the bodies in recovery of their original shapes than is spent on them in deformation, and also causing a slight set which may be either temporary or permanent. The reason why the first load-carrying lamina 72 is formed without mechanical hysteresis is that the load-carrying lamina 72 is formed in the melt phase, when all internal stresses are relieved, by the thermal pressure forming apparatus, shown in either FIGS. 2, 7, 11 or 12. This apparatus causes strengthening with orientation of the first load-carrying lamina 72 in at least one axis, but without memory of its pre-melt phase shape.

As shown in FIG. 15, the second sealing lamina 82 is made of the second plastic material and is coextensive with the first load-carrying lamina 72 that becomes the outer wall portion 76 shown in FIG. 17.

Thus, the container 46A formed from the precut plastic blank 22A of FIG. 15 and shown in FIG. 17 can withstand temperatures and pressures of either a retort chamber or a microwave oven without undergoing significant and permanent distortion, unlike the non-retortable containers known in the prior art and as particularly exemplified by the container disclosed in U.S. Pat. No. 3,606,958 of Coffman.

The operation of the apparatus will now be described in detail. In the first embodiment of the precut blank conveying system best shown in FIG. 2, the trays 36 are placed on the conveyor 38 which carries such trays 36 through the oven 40 to the forming press 44. After the precut blanks 22 held by the carrier rings 52 are formed into containers 46 and the trays 36 are subsequently transferred to the elevator 48, the containers 46 are then removed from the trays 36, and such trays 36 with the carrier rings 52 therein are lifted by the elevator 48 and returned by the conveyor 49 to the starting point of the process.

Referring now to FIG. 5, radiant heat emanating from the upper and lower heating elements 40A and 40B of the oven 40 penetrate the top and bottom surfaces of each precut plastic blank 22. Because these top and bottom surfaces are almost completely exposed except for the bottom peripheral edge, the temperature is substantially uniform across such surfaces of the plastic blank 22. The dwell time of each tray 36 carrying the plastic blanks 22 through the oven 40 is sufficient to raise the temperature of each blank 22 to its melting point. The temperature inside the oven 40 is controlled by a computerized system (not shown) which constantly senses the oven temperature and adjusts it accordingly such that the plastic blanks 22 exiting the oven 40 are at the selected melting temperature. The internal stresses created during the extruding of the sheet of plastic material 12 from which the blanks 22 were cut are relieved at this predetermined crystalline melting temperature.

Referring back to FIG. 3, the retortable containers 46 produced from the blanks 22 by the forming press 44 are essentially stress-free and, thus, are not susceptible to distortion when subjected to the elevated temperatures within the retort, whereas prior art containers, when produced from similar plastic materials in solid phase pressure forming (SPPF) processes, i.e. below the crystalline melting temperature of the selected plastic material, are markedly stressed and will undergo varying degrees of reversion or distortion as the stresses are relaxed during residence in the retort.

Shown in FIG. 6, a key feature of the apparatus is the carrier ring 52 which plays an important part in preserving the dimensional stability of each precut blank 22 while the plastic thereof is in its melt phase.

As has been noted by prior inventors who have performed work regarding the forming of plastics at elevated temperatures, e.g. in U.S. Pat. No. 3,684,258, such plastics at their melting temperatures "lose shape and become sticky" (column 1, lines 21 to 26.) Thus, the prior art has taught against heating plastic blanks into the melt phase because such melting plastic distorts and adheres tenaciously to similar plastic or other materials on contact. Consequently, the problem of handling plastic blanks in the melt phase in a container production environment has been heretofore unsolved.

The inventor has developed a solution which overcomes this problem. The solution is to handle each precut plastic blank 22, while in its melt phase, only along a small portion of its outer periphery.

This solution requires minimum contact between the plastic blanks 22 and any other surface. Such contact is minimized, as shown in FIG. 6, by placing each plastic blank 22 in contact only with the ledge 62 of the carrier ring 52, thus effectively supporting the plastic blank 22 without contact at any other part of its surface throughout the entire conveying system.

Contact between the upstanding side wall of each plastic blank 22 and the inner vertical periphery of the carrier ring 52 will occur due to the expansion of each blank 22 during heating. However, this expansion will enhance heat transfer away from each blank 22 and also will ensure the hoop strength of each plastic blank 22. Therefore, contact between the inner vertical periphery of the carrier ring 52 and the upstanding side wall of each plastic blank 22 shields the edges of each blank 22 from direct radiation. Consequently, a narrow peripheral portion of the bottom surface, as well as the upstanding side wall, of each plastic blank 22 does not reach the crystalline melting point while the remaining mass of each blank 22 is in the melt phase. Thus, maintaining the periphery of each plastic blank 22 below the crystalline melting point effectively prevents the plastic blank 22 from sticking to the carrier ring 52.

Also, since the peripheral edge of the plastic blank 22 is maintained within the solid phase, the circumference of each plastic blank 22 maintains sufficient hoop strength so that reversion, i.e. the tendency of the plastic to distort, is overcome. Such reversion would normally occur whenever the unconstrained, prestressed plastic blanks 22 are heated to the melting point.

Consequently, as shown in the first embodiment of the apparatus in FIG. 2 and the second embodiment of the apparatus in FIG. 7, the plastic blanks 22 resting on the ledge 62 of the carrier rings 36 enter the forming press 44 from the oven 40 stress-relieved to a substantially greater degree than billets in the prior art, such as those used in the SPPF technology.

Likewise, as shown in the third embodiment of the apparatus in FIG. 11 and the fourth embodiment of the apparatus in FIG. 12, the plastic blanks 22, with the retaining rings 37 resting on their top peripheral edges while the plastic blanks 22 themselves rest on the ledges 62 of the carrier rings 36, are also substantially stress-relieved.

As best shown in FIG. 14, the side edge of each plastic blank 22 will be in contact with the upstanding wall on the inner periphery of the carrier ring 52. These areas of contact on the ledge 62, along the peripheries, and under the retaining ring 37 maintain the edge of each plastic blank 22 in the solid phase because the metal carrier ring 52 and the metal retaining ring 37 both act as heat sinks to draw out heat from the edge of the plastic blank 22. Hoop strength resulting from contact of the hot plastic material with the cooler metal material at the rim maintains the peripheral dimensions of each plastic blank 22 while its center is in the melt phase.

Thus, a key feature of the third and fourth embodiments of the apparatus is the retaining ring 37 which, with the carrier ring 52, plays an important part in preserving the dimensional stability of each blank 22 while the bulk of the plastic thereof is in its melt phase. Marking or scoring of the plastic blank 22 is avoided by placing each blank 22 in contact only with the ledge 62 of the carrier ring 52 and with the thin retaining ring 37, thus effectively suspending the blank 22 out of contact with anything else throughout the entire conveying system. Because of the presence of the ledge 62 and the retaining ring 37, the peripheral edges of each blank 22 are prevented from receiving direct heat emanating from the oven 40.

Moreover, the containers 46 formed using the apparatus are retortable because the apparatus forms the containers 46 from plastic blanks 22 having their centers at melting temperatures but having their peripheries maintained in solid phase. These containers are able to withstand the retorting temperatures, typically 255 to 265 degrees F, in commercial canning processes without evidencing significant permanent distortion.

There are two preferred embodiments of the container 46: a first container 46A is shown in FIG. 17 and a second container 46B is shown in FIG. 18. The nature of these container products will now be described.

In regard to the first embodiment of the container 46A produced by the apparatus, the first retortable container 46A of FIG. 17 is made of at least two co-formed laminas and includes the wall made of the two portions 76 and 86. The outer wall portion 76 includes the first load-carrying lamina 72 shown in FIG. 15 and is made of the first plastic material formed without mechanical hysteresis in the melt phase by the thermal pressure forming apparatus to cause strengthening with orientation in at least one axis but without memory of its pre-melt phase shape.

The first retortable container 46A of FIG. 17 also includes a rim 84 having the first load-carrying lamina 72 of FIG. 15 made of the first plastic material formed in the solid phase by the thermal pressure forming apparatus to cause strengthening.

The inner wall portion 86 and the rim 84 of the first retortable container 46A of FIG. 17 both have the second sealing lamina 82 of FIG. 15 of the second plastic material being coextensive with the first load-carrying lamina 72 of FIG. 15.

The first load-carrying lamina 72 and the second sealing lamina 82 of FIG. 15 are the co-formed laminae which are highly impermeable to fluids selected from the group consisting of oxygen and aromatic vapors.

Thus, the first container 46A can withstand temperatures and pressures of a retort chamber without undergoing significant and permanent distortion.

In regard to the second embodiment of the container 46 produced by the apparatus, the second retortable container 46B of FIG. 18 has the wall made of at least two co-formed laminas. In this particular embodiment, the wall has three laminas, i.e. the inner wall portion 86, the outer wall portion 76, and the interior wall portion 80. This wall is highly impermeable to fluids selected from the group consisting of oxygen and aromatic vapors.

In the second retortable container 46B of FIG. 18, the outer wall portion 76 includes the first load-carrying lamina 72 shown in FIG. 16 and is made of the first plastic material. This load-carrying lamina 72 of FIG. 16 is formed without mechanical hysteresis in the melt phase by the thermal pressure forming apparatus to cause strengthening with orientation of the load-carrying lamina 72 in at least one axis but without memory of its pre-melt phase shape. The second sealing lamina 82 shown in FIG. 16 and made of the second plastic material is coextensive with the first load-carrying lamina 72.

This second sealing lamina 82 of FIG. 16 is sandwiched between a plurality of the first load-carrying lamina 72 in order to form the second retortable container 46B of FIG. 18.

Thus, the second container 46B of FIG. 18 has the outer wall portion 76 made of the first load-carrying lamina 72 of FIG. 16 and also has the rim 84 likewise made of the first load-carrying laminas 72 of FIG. 16. However, the first load-carrying laminas 72 of FIG. 16 used in the rim 84 of FIG. 18 is made of the first plastic material formed in the solid phase by the thermal pressure forming apparatus to cause strengthening.

The inner wall portion 86 and the rim 84 of the second retortable container 46B shown in FIG. 18 both have the second sealing lamina 82 of FIG. 16 made of the second plastic material. This second sealing lamina 82 is also coextensive with the first load-carrying lamina 72.

The first load-carrying lamina 72 and the second sealing lamina 82 are the co-formed laminas of the second retortable container 46B of FIG. 18. These co-formed laminas are highly impermeable to fluids selected from the group consisting of oxygen and aromatic vapors.

In regard to the first retortable container 46A of FIG. 17 and the second retortable container 46B of FIG. 18, the first plastic material used to make the first load-carrying lamina 72 of FIGS. 15 and 16 is a linear polyolefin polymer and the second plastic material used to make the second sealing lamina 82 of FIG. 15 and 16 is a member selected from the group consisting essentially of a polyvinylidine chloride and an ethyl vinyl alcohol. A preferred polyvinylidine chloride (PVdC) is sold under the SARAN trademark and is manufactured by the Dow Chemical Company of Midland, Mich. A preferred ethyl vinyl alcohol (EVOH) is made by the Eval Company of America and is commercially available from many chemical wholesalers.

The second sealing lamina 82 of FIGS. 15 and 16 is highly impermeable to oxygen to make the first retortable container 46A of FIG. 17 and the second retortable container 46B of FIG. 18 especially suitable for food preservation. The second sealing lamina 82 is also highly impermeable to aromatic vapors to make the containers 46A and 46B especially suitable for volatile fuels.

The foregoing preferred embodiments of the containers are considered illustrative only. Numerous other modifications and changes will readily occur to those persons skilled in the plastic container forming art after reading this disclosure. Consequently, the disclosed invention is not limited to the exact construction shown and described above but rather is encompassed within the letter and spirit of the following claims.

I claim:

1. A retortable container having a wall of at least two co-formed laminas, said wall being highly impermeable to fluids selected from the group consisting of oxygen and aromatic vapors, said wall comprising:
   a first load-carrying lamina of a first plastic material, said load-carrying lamina having been formed, after an initial melt phase followed by extruding, cooling, and remelting, without mechanical hysteresis after a second melt phase, by a thermal pressure forming apparatus to cause strengthening by recooling with random orientation of the first plastic material in the first load-carrying lamina without memory of a shape of an intermediate plastic blank assumed after the initial melt phase but before the second melt phase; and
   a second sealing lamina of a second plastic material, said second sealing lamina being coextensive with the first load-carrying lamina;
   wherein said container can withstand temperatures and pressures of a retort chamber without undergoing significant and permanent distortion;
   wherein said container is made by a method of thermal pressure forming of the intermediate plastic blank cut from an initial plastic sheet, said method comprising the steps of:
   a. bringing the plastic blank from a solid phase to the second melt phase by heating said plastic blank to a melting temperature sufficient to relieve internal stresses in said plastic blank while conveying the plastic blank on a conveying means through the heating means;
      said conveying means including at least a plurality of trays, each having a plurality of holes therethrough in which preventing means are placed;
   b. preventing the plastic blank in the solid phase from going into the second melt phase while in the heating means only along outer peripheral edges thereof so that the plastic blank maintains its hoop strength and peripheral dimensions;
      said preventing step including the substep of suspending the plastic blank across said preventing means; and
   c. forming the plastic blank into said container.

2. The retortable container, according to claim 1, wherein:
   said first plastic material is a linear polyolefin polymer.

3. The retortable container, according to claim 1, wherein:
   said second plastic material is a member selected from the group consisting essentially of a polyvinylidine chloride and an ethylene vinyl alcohol.

4. The retortable container, according to claim 1, wherein:
   said second sealing lamina is highly impermeable to oxygen to make the container especially suitable for food preservation.

5. The retortable container, according to claim 1, wherein:
   said second sealing lamina is highly impermeable to aromatic vapors to make the container especially suitable for volatile fuels.

6. The retortable container, according to claim 1, wherein:
   said second sealing lamina is sandwiched between a plurality of the first load-carrying lamina.

7. The retortable container made by the method according to claim 1, wherein:
   said conveying means further includes a conveyor on which the plurality of trays is conveyed.

8. The retortable container made by the method according to claim 1, wherein:
   said trays are linked together to form a conveyor.

9. A retortable container of at least two co-formed laminas, comprising:
   a wall having a first load-carrying lamina of a first plastic material formed after an initial melt phase without mechanical hysteresis in a second melt phase by a thermal pressure forming apparatus to cause strengthening by recooling with random orientation of the first plastic material therein without memory of a shape of an intermediate plastic blank;
   a rim having the first load-carrying lamina of the first plastic material formed int he solid phase by the thermal pressure forming apparatus to cause strengthening;
   said wall and said rim both having a second sealing lamina of a second plastic material being coextensive with the first load-carrying lamina;
   said first load-carrying lamina and said second sealing lamina being co-formed laminas highly impermeable to fluids selected from the group consisting of oxygen and aromatic vapors;
   whereby said container can withstand temperatures and pressures of a retort chamber without undergoing significant and permanent distortion;
   wherein said container is made by a method of thermal pressure forming of the intermediate plastic blank cut from an initial plastic sheet, said method comprising the steps of:
   a. bringing the plastic blank from a solid phase to the second melt phase by heating said plastic blank to a melting temperature sufficient to relieve internal stresses in said plastic blank while conveying the plastic blank on a conveying means through the heating means;

said conveying means including at least a plurality of trays, each having a plurality of holes therethrough in which preventing means are placed;

b. preventing the plastic blank in the solid phase from going into the second melt phase while in the heating means only along outer peripheral edges thereof so that the plastic blank maintains its hoop strength and peripheral dimensions;

said preventing step including the substep of suspending the plastic blank across said preventing means; and c. forming the plastic blank into said container.

10. The retortable container, according to claim 9, wherein:
said first plastic material is a linear polyolefin polymer.

11. The retortable container, according to claim 9, wherein:
said second plastic material is a member selected from the group consisting essentially of a polyvinylidine chloride and an ethylene vinyl alcohol.

12. The retortable container, according to claim 9, wherein:
said second sealing lamina is highly impermeable to oxygen to make the container especially suitable for food preservation.

13. The retortable container, according to claim 9, wherein:
said second sealing lamina is highly impermeable to aromatic vapors to make the container especially suitable for volatile fuels.

14. The retortable container, according to claim 9, wherein:
said second sealing lamina is sandwiched between a plurality of the first load-carrying lamina.

15. A retortable container made by the method according to claim 9, wherein:
said conveying means further includes a conveyor on which the plurality of trays is conveyed.

16. The retortable container made by the method according to claim 9, wherein:
said trays are linked together to form a conveyor.

* * * * *

UNITED STATES PATENT AND TRADEMARK OFFICE
CERTIFICATE OF CORRECTION

PATENT NO.   :   4,997,691

DATED        :   March 5, 1991

INVENTOR(S)  :   Keith Parkinson

It is certified that error appears in the above-identified patent and that said Letters Patent is hereby corrected as shown below:

```
     Cover page, right col., line 3, "4,562,325" should be
--4,652,325--; and
             line 4, after "Wallace", insert --et al.--.
     Col. 3, line 31, delete ",".
     Col. 6, line 65, change "and" to --. The container
46A--.
     Col. 7, line 14, "thickness" should be --thicknesses--;
             line 15, "is" should be --are--; and
             line 15, delete "," (first occurrence).
     Col. 10, line 48, "laminas" should be --lamina--; and
              line 49, "laminas" should be --lamina--.
     Col. 11, line 2, "FIG." should be --FIGS.--;
              line 4, "ethyl" should be --ethylene--; and
              line 8, "ethyl" should be --ethylene--.
     Col. 12, line 46, claim 9, "int he" should be --in
the--.
```

Signed and Sealed this

Fourth Day of June, 1991

*Attest:*

HARRY F. MANBECK, JR.

*Attesting Officer*    *Commissioner of Patents and Trademarks*